United States Patent Office 3,281,511
Patented Oct. 25, 1966

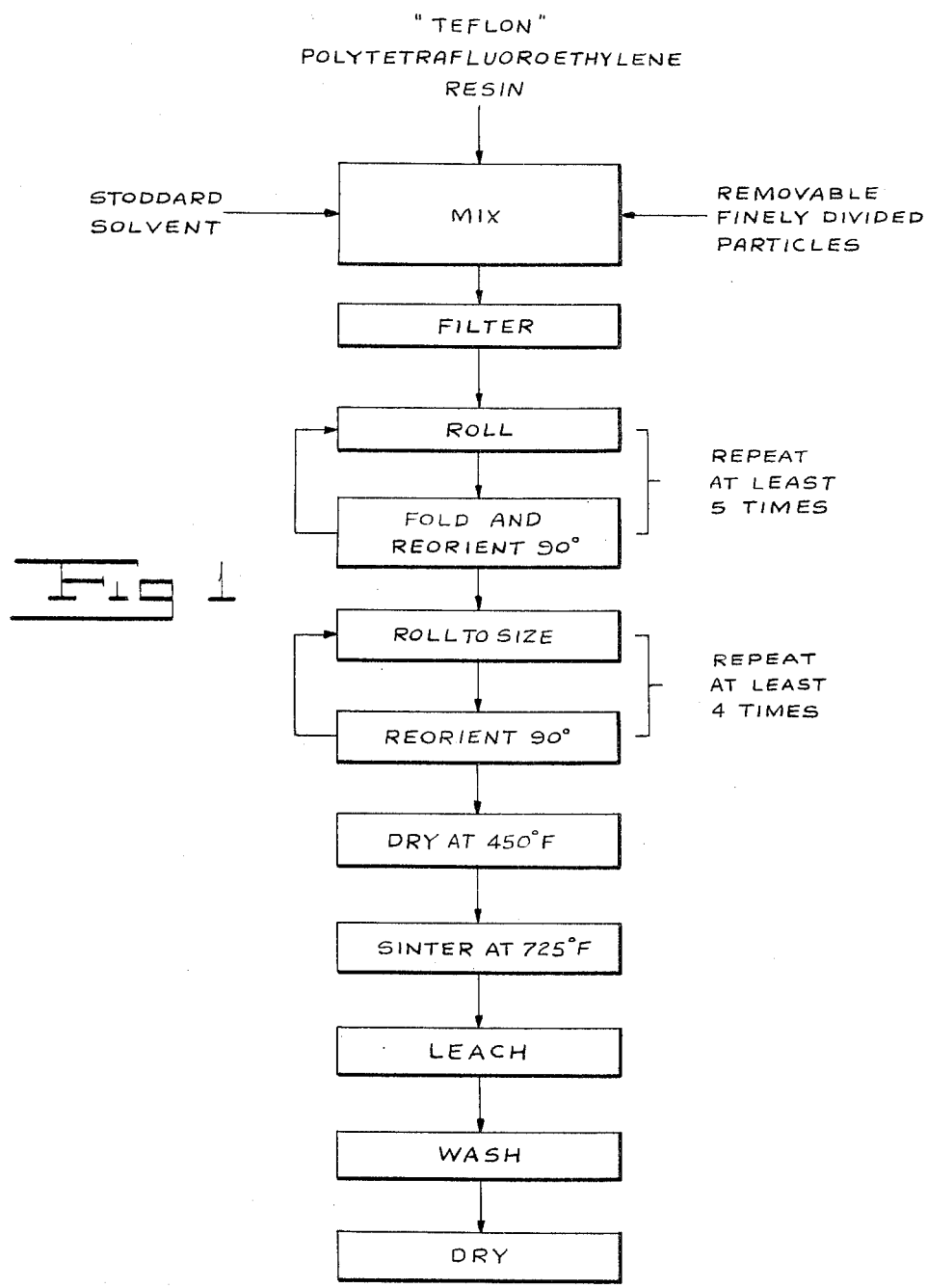

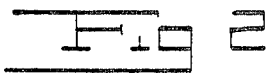
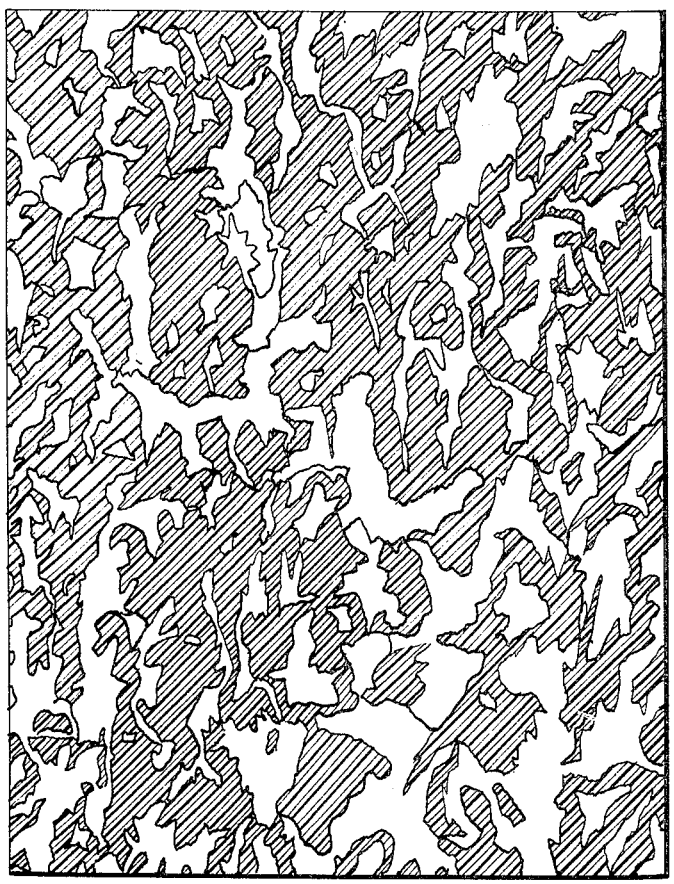

3,281,511
METHOD OF PREPARING MICROPOROUS TETRA-FLUOROETHYLENE RESIN SHEETS
Robert Goldsmith, West Paterson, N.J., assignor to General Plastics Corporation, Bloomfield, N.J., a corporation of New Jersey
Filed May 15, 1964, Ser. No. 367,723
7 Claims. (Cl. 264—49)

My invention relates to a method of preparing microporous tetrafluoroethylene resin sheets and more particularly to an improved method of preparing microporous tetrafluoroethylene resin sheets having increased tensile strength and the ability to withstand flexing.

Throughout this specification we will refer to polytetrafluoroethylene resin by its trademark "Teflon" which trademark is owned by E. I. du Pont de Nemours & Co. The Teflon which we employ as one of our starting materials is a fine powder such as described in United States Patent 3,010,950 and sometimes designated as "Teflon 6."

Teflon has the unique property in that water does not wet it. Furthermore, Teflon can be employed at very low temperatures or temperatures as high as 500° F. These unique properties make microporous Teflon sheets useful for electrolytic diaphragms for oxygen generators, fuel cells and the like. Microporous Teflon sheets may be used as filtering material where corrosive agents are present as, for example, in the manufacture of gold cyanide. Microporous Teflon sheets may be used as battery separators or as a non-wetting breather for instruments which are subjected to exposure to water but which while watertight must permit the passage of gas as, for example, in housings for marine signal buoys and the like.

The microporous Teflon sheets of the prior art have comparatively low tensile strength. A solid sheet of Teflon, for example, 63 mils in thickness, has a tensile strength of about 1500 p.s.i. Porous Teflon sheets of the prior art of varying thicknesses were found to have a tensile strength of about 150 p.s.i. For example, sheets 63 mils in thickness, 125 mils in thickness and 250 mils in thickness were found to have this same low tensile strength.

Besides having a comparatively low tensile strength of only 150 p.s.i., a single flexure of a porous Teflon sheet of the prior art cracks it. Stated otherwise, porous Teflon sheets of the prior art are brittle or frangible.

One object of my invention is to provide a process for making microporous Teflon sheets which has superior tensile strength.

Another object of my invention is to provide a method of making microporous Teflon sheets which are flexible.

A further object of my invention is to provide microporous Teflon sheets having superior tensile strength and marked ability to withstand flexing.

Other and further objects of my invention will appear from the following description.

In the accompanying drawings which form part of the instant specification:

FIGURE 1 is a diagrammatic view showing the steps of my process.

FIGURE 2 is a sectional view showing a microphotograph of my improved microporous Teflon sheet magnified about 300 diameters.

In general, my invention contemplates mixing the fine Teflon powder with a carrier and a readily removable filler material. The dough thus made is then rolled with intermediate reorientation so the particles are biaxially oriented. The solvent is then evaporated and the Teflon is sintered at above its melting temperature. The filler material is then removed by an appropriate solvent depending on the character of the filler material. If desired, the sheet may be bleached after the removal of the comminuted filler, then washed and dried.

More particularly, the carrier may be one of a number of materials. It should vaporize readily without any residue. A liquid having a viscosity of from 0.5 to 100 centipoises may be used. A naphtha having a boiling range between 190° F. and 240° F. and a specific gravity of 0.735 can be used. I prefer to use Stoddard solvent which is a petroleum distillate generally water white and having a flash point not lower than 100° F. Fifty percent of the distillate boils off at 350° F. and the end point is 410° F. The distillate is largely saturated hydrocarbons since not more than 5% of the solvent is absorbed by concentrated sulfuric acid.

It will be understood, of course, that while I prefer to use Stoddard solvent owing to its uniformity of quality and ready availability, my invention is not to be limited to a specific carrier.

The filler material may be any appropriate readily removable finely divided particles. The size of the filler particles will determine the size of the pores. Filler materials may be ammonium carbonate ($NH_4CO_3$), sodium chloride (NaCl), colloidal boehmite alumina (AlOOH) or the like. The sodium chloride may, if desired, be micro size, that is, 55% of the particles should pass through a 325 mesh sieve while the remainder will pass through a 200 mesh sieve or finer. The ammonium carbonate particles may be of such size that they will pass through a sieve of from 50 to 100 mesh, or be of smaller particles. Larger sodium chloride particles may be used as, for example, of such size that the particles will pass through at least a 50 mesh or 100 mesh sieve.

I have discovered that for known filler particles of the prior art in order to form a good filter the pore forming material must be equal in weight to or in excess by weight of the weight of the Teflon employed. Unless this is done there will be complete encapsulation of some of the pore forming material with the result that such encapsulated material cannot be readily removed and furthermore some of the pores will not be communicating with one another thus reducing the filtering action which is desired and inhibiting the desired porosity.

EXAMPLE 1

I mixed 300 cc. of Stoddard solvent with 16 grams of ammonium carbonate, 8 grams of finely divided sodium chloride and 16 grams of Teflon in a Cowles blender adding the Teflon powder last. After mixing for ten minutes I filtered the mixture through a vacuum filter and dried the cake for about fifteen minutes. The cake was then squared and cut in half. I passed a half cake between rolls. The inter-roll space may vary from ¼" to ⅛" or less. Advantageously I employ a roll setting of 0.18". The first pass will produce an elongated doughy strip. This is folded on itself, rotated 90° and again passed through the rolls. The resulting sheet from the second pass is then folded on itself, rotated 90° and again passed between the rolls. The resulting sheet from the third rolling is again folded on itself, rotated 90° and passed between the rolls. The sheet from the fourth rolling is then folded on itself, rotated 90° and again passed through the rolls. If desired, the rolling to size may then take place. Advantageously the folding, re-orientation and re-rolling may be performed a number of additional times.

After the initial rollings and foldings the strip is passed between rolls which are reduced in inter-roll spacing. For example, if the finished thickness is to be 30 mils, the inter-roll spacing is reduced from .18″ in spacing to .120″ in spacing on the first pass. The rolled material from the first pass is reoriented through 90°, the roll spacing reduced to .080″ and the sheet passed through the rolls. The inter-roll space is then reduced to .055″, the rolled material from the second pass is reoriented 90° and passed through the rolls. The inter-roll spacing is then reduced to the desired .030″ and the rolled material from the third rolling reoriented through 90° and passed through the rolls.

It is to be understood, of course, that this process can be continued and that the inter-roll spacing may be varied as desired. I have made sheets having respective thicknesses between 5 mils and 50 mils. It is also to be understood that the reduction of size can be more gradual if desired with finer adjustments of the inter-roll spacing.

After the sheet has been rolled to its size in respect of thickness, it is dried at 450° F. to ensure that all of the carrier solvent is evaporated. This drying is carried on for about two hours. The temperature is gradually raised to 450° F. over an hour and a half and the rolled sheet permitted to remain at this temperature for about half an hour. Owing to the fact that ammonium carbonate decomposes at about 137° F., by the time the sheet is to the drying temperature the ammonium carbonate will be decomposed and pass off in the form of ammonia, carbon dioxide and steam. This enables the salt particles to be more easily removed with this filler material.

The dried sheet having the desired thickness is then placed between two plates which are heated to a temperature of about 725° F. and permitted to remain between the plates for a period of between twenty minutes and forty-five minutes. This sinters the Teflon.

The sodium chloride is then leached from the pores by boiling the sheet in water to which a suitable wetting agent may be added if desired. Appropriate wetting agents are alkylarylpolyether alcohol mixed with sulphonated castor oil, sodium salts of alkylarylpolyether sulfates in isopropyl alcohol, or the like.

The boiling should be long enough to ensure that all of the sodium chloride has been leached; a period of one hour or more may be employed. After the leaching the microporous sheet is washed by letting it soak in distilled water for about three hours. This may be repeated several times if desired.

If a light color is desired, the sheet can be bleached by soaking it overnight in a 5% solution of sodium hypochlorite after which the bleach is washed by soaking it for three hours in water and then changing the water and repeating this at least once or twice.

The sheet is then dried in air which may be heated to 150° F. after which the finished product is cut to desired dimensions.

The sheet which was made by the process of Example 1 which is described was found to be 31.6 mils in thickness. It had tensile strength of 948 p.s.i. and a tear strength of 6 lbs. It could be repeatedly fixed without fracture or rupture as is the case with porous Teflon sheets of the prior art. The sintered sheet contained about 66.7% of Teflon. Its porosity was tested with a porosity tester described in Pall Patent 3,007,334. The average size of the pores was determined to be 6.3 microns.

EXAMPLE 2

I mixed 300 cc. of Stoddard solvent with 16 grams of ammonium carbonate, 16 grams of finely divided sodium chloride and 16 grams of Teflon and then proceeded as in Example 1. The thickness of the microporous sheet was found to be 30.5 mils and its tensile strength was 998 p.s.i. The average pore size was found to be 21 microns.

EXAMPLE 3

I mixed 300 cc. of Stoddard solvent with 8 grams of ammonium carbonate, 8 grams of finely divided sodium chloride and 16 grams of Teflon and proceeded as in Example 1.

The finished sheet was found to have a thickness of 24.5 mils and a tensile strength of 722 p.s.i. The average pore size was found to be 6.8 microns.

EXAMPLE 4

I mixed 300 cc. Stoddard solvent with 16 grams of sodium chloride fine enough to pass through a 100 mesh screen and 16 grams of Teflon, and proceeded as in Example 1. The finished sheet had a thickness of 30 mils and the average pore size was found to be 1.9 microns.

EXAMPLE 5

I mixed 300 cc. of Stoddard solvent with 16 grams of ammonium carbonate fine enough to pass through a 100 mesh screen and 16 grams of Teflon. I then proceeded as in Example 1. The finished sheet having a thickness of 29 mils had an average pore size of 69.2 microns.

EXAMPLE 5(a)

I proceeded as in Example 5 except that I reduced the inter-roll spacing so that the finished sheet had a thickness of 11 mils. Its average pore size was 30.4 microns.

In the foregoing examples it will be noted that the pore forming material was equal to by weight or in excess by weight of the weight of the Teflon employed.

Colloidal boehmite alumina is formed in particles which appear to be elongated needles in form. I have discovered that if this material is used as the pore forming material not only can smaller pores be formed but a smaller amount by weight of pore forming material than the weight of Teflon can be used with advantageous results.

EXAMPLE 6

I mixed 600 cc. of Stoddard solvent with 48 grams of powdered Teflon and 16 grams of colloidal boehmite alumina. This material is sold by E. I. du Pont de Nemours & Co. under the trademark "Baymal." Its chemical composition is as follows:

|  | Percent |
|---|---|
| AlOOH | 84.7 |
| $CH_3COOH$ | 8.5 |
| $SO_4$ | 1.76 |
| Water | 2.7 |

It consists of a white, free flowing powder comprising clusters of minute fibrils.

I then proceeded as in Example 1 except that I found the Baymal difficult to remove. It was necessary to leach by using 10% hydrochloric acid for from 36 to 60 hours at 150° F. After this length of time, the colloidal alumina was leached from the material and the process completed as in Example 1.

A sheet of the finished material 2.9 microns in thickness had the remarkable and surprising tensile strength of 1980 p.s.i. and the pore size was found to be less than 1.5 microns.

EXAMPLE 7

I mixed 40 grams of Teflon with 28 grams of Baymal and 600 cc. of Stoddard solvent and proceeded as in Example 6. A finished sheet of 3.1 mils in thickness had a tensile strength of 1510 p.s.i. and an average pore size of 2.1 microns.

It will be observed that the increase in the weight of Baymal increased the pore size and somewhat reduced the tensile strength.

In all of the examples above given the finished sheet was very flexible, having a leather-like feel and handle.

EXAMPLE 8

I mixed 7 lbs. of finely divided Teflon powder sold by E. I. du Pont de Nemours & Co. under the trademark "Teflon 6" with two gallons of Stoddard solvent and added 7 lbs. of colloidal alumina sold by E. I. du Pont de Nemours & Co. under the trademark "Baymal" and proceeded as in Example 6. I made a series of sheets by the process of Example 6 ranging in thickness from 10 mils to 50 mils. The tensile strength of the finished material was found to be 873 p.s.i. Porosity tests showed that 100% of the pores ranged from 95 microns to .06 micron, 90% of the pores ranged from 45 microns to .09 micron, while 70% of the pores lay in the range between 3 microns and .35 micron. These microporous Teflon sheets had the characteristic ability of easy flexure without cracking, and had the characteristic leather-like feel.

It will be seen that I have accomplished the objects of my invention. I have provided a microporous Teflon sheet of relatively high tensile strength and marked ability to withstand flexing. My microporous sheets can be used with safety as electrolytic diaphragms for oxygen generators, electrolytic diaphragms for fuel cells, for battery separators for filtering corrosive materials, as breather membranes which are liquid impervious but which will pass gases and can be used as protective clothing to permit the body pores to breathe while protecting the human body against corrosive chemical environments.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of preparing microporous polytetrafluoroethylene resin sheets including the steps of mixing a major amount of finely divided tetrafluoroethylene resin powder in a Stoddard solvent carrier with a minor amount of colloidal boehmite alumina, filtering the mixture to form a dough, rolling the dough into a strip to uniform thickness, folding the strip upon itself, reorienting the same through 90°, re-rolling the strip, repeating the first folding and reorienting steps a plurality of times, then reducing the thickness of the strip by rolling, reorienting the dough strip of reduced thickness 90° and further reducing the strip in thickness after reorientation, continuing the progressive rolling to reduced thickness and second reorienting steps a plurality of times, drying the strip of reduced thickness at a temperature above the dry point of the Stoddard solvent carrier to remove the same, sintering the dried strip at a temperature of about 725° F., leaching the particles of boehmite alumina from the dried strip with a solution of hydrochloric acid, washing the strip and drying it to produce the desired microporous polytetrafluoroethylene resin sheets.

2. A method of preparing microporous polytetrafluoroethylene resin sheets including the steps of mixing finely divided polytetrafluoroethylene powder in a carrier liquid with removable finely divided particles, the weight of said finely divided particles being equal to or greater than the weight of the polytetrafluoroethylene, filtering the mixture to form a dough, rolling the dough into a strip to uniform thickness, folding the strip upon itself, reorienting the same through 90° and re-rolling the strip, repeating the first folding and reorienting steps a plurality of times, then reducing the thickness of the strip by rolling, reorienting the strip of reduced thickness 90° and further reducing the strip in thickness after reorientation, continuing the progressive rolling to reduced thickness and second reorienting steps a plurality of times, drying the strip of reduced thickness to remove the carrier, sintering the dried strip at a temperature above the melting point of the polytetrafluoroethylene, leaching the finely divided particles from the sintered strip, washing the strip and drying it to produce the desired microporous polytetrafluoroethylene resin sheet.

3. A method of preparing microporous polytetrafluoroethylene resin sheets including the steps of mixing finely divided polytetrafluoroethylene resin powder in a carrier liquid with removable finely divided particles, filtering the mixture to form a dough, rolling the dough into a strip to uniform thickness, folding the strip upon itself, reorienting the same through 90° and re-rolling the strip, repeating the first folding and reorienting steps a plurality of times, then reducing the thickness of the strip by rolling, reorienting the strip of reduced thickness 90° and further reducing the strip in thickness after reorientation, continuing the progressive rolling to reduced thickness and second reorienting steps a plurality of times, drying the strip of reduced thickness to remove the carrier, sintering the dried strip at a temperature above the melting point of polytetrafluoroethylene resin, leaching the finely divided particles from the sintered strip, washing the strip and drying it to produce the desired microporous polytetrafluoroethylene resin sheet.

4. A method of preparing microporous polytetrafluoroethylene resin sheets including the steps of mixing finely divided polytetrafluoroethylene resin powder in a carrier liquid with removable finely divided particles, filtering the mixture to form a dough, rolling the dough into a strip to uniform thickness, folding the strip upon itself, reorienting the same and re-rolling the strip, repeating the first folding and reorienting steps a plurality of times, then reducing the thickness of the strip by rolling, reorienting the strip of reduced thickness and further reducing the strip in thickness after reorientation, continuing the progressive rolling to reduced thickness and second reorienting steps a plurality of times, drying the strip of reduced thickness to remove the carrier, sintering the dried strip at a temperature above the melting point of polytetrafluoroethylene resin, leaching the finely divided particles from the sintered strip, washing the strip and drying it to produce the desired microporous polytetrafluoroethylene resin sheet.

5. A method of preparing microporous polytetrafluoroethylene resin sheets including the steps of forming a dough of finely divided polytetrafluoroethylene resin powder in a carrier liquid with removable finely divided particles, rolling the dough into a strip, reorienting the rolled strip and re-rolling the same, repeating the rolling and reorienting steps a plurality of times, drying the strip to remove the carrier, sintering the dried strip at a temperature above the melting point of polytetrafluoroethylene resin, leaching the finely divided particles from the sintered strip, washing the strip and then drying it to produce the desired microporous polytetrafluoroethylene resin sheet.

6. A method of preparing microporous polytetrafluoroethylene resin sheets including the steps of mixing finely divided tetrafluoroethylene resin powder in a carrier liquid with removable finely divided particles, filtering the mixture to form a dough, rolling the dough into a strip, reorienting the rolled strip and re-rolling the same, repeating the rolling and reorienting steps a plurality of times, drying the strip to remove the carrier, sintering the dried strip at a temperature above the melting point of polytetrafluoroethylene resin, leaching the finely divided particles from the sintered strip, washing the strip and then drying it to produce the desired microporous polytetrafluoroethylene resin sheet.

7. A method of preparing microporous polytetrafluoroethylene resin sheets including the steps of mixing finely divided polytetrafluoroethylene resin powder in a carrier liquid with removable finely divided particles, filtering the mixture to form a dough, rolling the dough into a strip, reorienting the rolled strip, re-rolling the reoriented strip, repeating the rolling, reorienting and re-rolling steps a plurality of times, drying the strip, removing the finely divided particles from the strip, sintering the strip at a temperature above the melting point of polytetrafluoroethylene, washing the strip and then drying it to produce the desired microporous polytetrafluoroethylene resin sheet.

References Cited by the Examiner

UNITED STATES PATENTS

| | | | |
|---|---|---|---|
| 1,619,359 | 3/1927 | Mell | 264—349 |
| 1,877,651 | 9/1932 | Eisenhardt | 264—108 |
| 2,011,553 | 8/1935 | Land | 264—108 |
| 2,353,877 | 7/1944 | Chollar | 264—49 |
| 2,707,201 | 4/1955 | Fernald et al. | 264—49 |
| 2,999,275 | 9/1961 | Blume | 264—108 |
| 3,152,082 | 10/1964 | Davis et al. | 264—127 |

FOREIGN PATENTS 943,624　12/1963　Great Britain.

ROBERT F. WHITE, *Primary Examiner.*

F. S. WHISENHUNT, J. R. HALL, *Assistant Examiners.*